March 1, 1960     H. B. KOLM, JR     2,926,696
HYDRAULIC CONTROL APPARATUS
Filed May 9, 1957
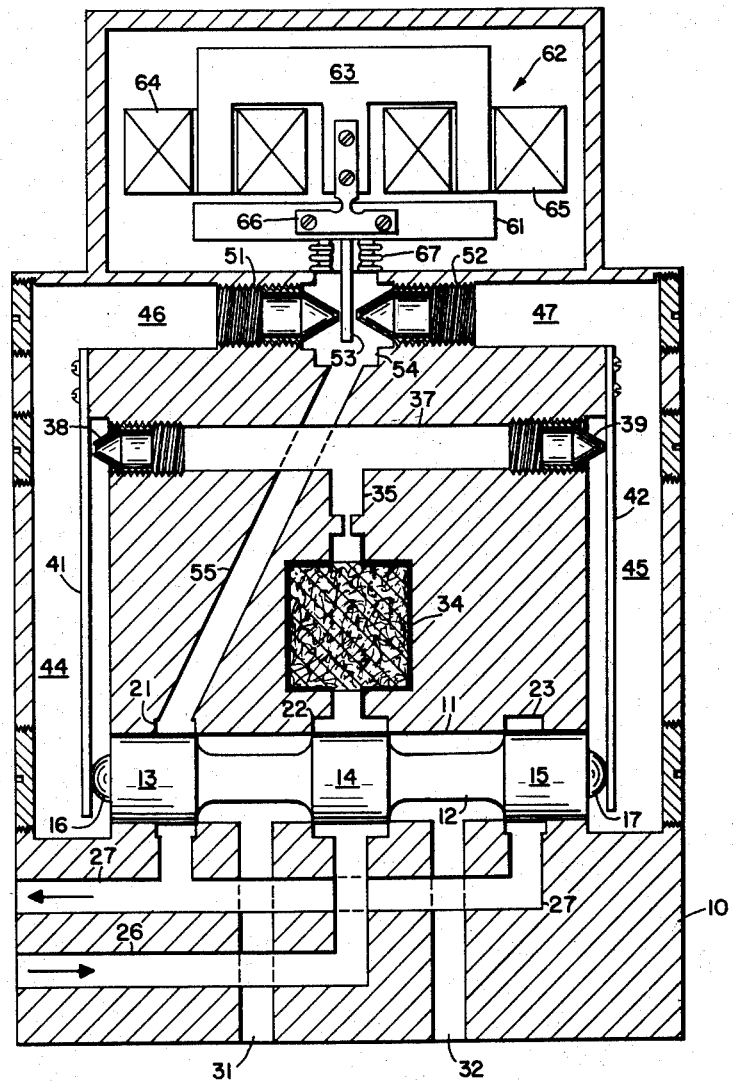
INVENTOR.
HARVARD B. KOLM JR.
BY
ATTORNEY

United States Patent Office 2,926,696
Patented Mar. 1, 1960

2,926,696

HYDRAULIC CONTROL APPARATUS

Harvard B. Kolm, Jr., Buffalo, N.Y., assignor to Minneapolis-Honeywell Regulator Company, Minneapolis, Minn., a corporation of Delaware Application May 9, 1957, Serial No. 658,168

6 Claims. (Cl. 137—623)

The present invention relates to an improved hydraulic servo control device. More specifically, it comprises a body having a bore within which a spool or piston member is positioned by differential pressure and wherein the differential pressure is a function of its own position and that of a flapper valve operated by a suitable actuator. Movement of the spool member results in diminishing the differential pressure that caused the movement initially and thereby provides a feedback function for the device so that the ultimate position reached by the spool member is a function of the position of the flapper valve. While devices of this sort are known, each of the pressures making up the present differential pressure is controlled by a flow restriction adjusted by the spool member and a series connected second flow restriction adjusted by an actuator such as an electromagnetic device. It is thus an object of this invention to provide an improved hydraulic servo control device of the sort herein described.

In the drawing, the single figure represents a sectional elevation of the present device.

In the figure, a body 10 includes a bore 11 having a spool 12 movable therein, the spool or piston member 12 fitting the bore closely but being readily slidable therein as is conventional in hydraulic apparatus of the present sort. Spool 12 includes piston or land portions 13, 14 and 15 and also has projections 16 and 17 at opposite ends thereof. The bore 11 has circumferential recesses 21, 22 and 23 arranged adjacent portions 13, 14 and 15 respectively of the piston member 12. Recess 22 is of substantially the same extent as member 14 so that, when 14 is exactly aligned with recess 22, there can be no appreciable leakage of flow from recess 22 past member 14. Recess 22 is connected to a supply of hydraulic fluid under pressure by a conduit 26. One edge of recess 21 is substantially aligned with the inner edge of piston member 13 so that when spool member 12 is centered, there can be no appreciable flow from recess member 21. Recess 21 is connected to a return conduit 27. One edge of recess 23 is also substantially aligned with the inner edge of member 15 so that there is substantially no flow possible from this recess past 15 when member 12 is centered. Recess 23 also connects to return conduit 27. In between recesses 21 and 22 is a passage 31 adapted to be connected to one side of a servo actuator and in between recesses 22 and 23 is a passage 32 adapted to be connected to the other side of a servo actuator, the servo actuator being conventional and not shown in this case.

Recess 22, through which high pressure supply fluid is furnished, is connected through a filter 34 formed by an enlarged passage in body 10 filled with suitable filtering material, the fluid passing through filter 34 and then passing through a restricted conduit 35 to a passage 37 generally parallel with bore 11. While a restricted passage 35 is shown, it has been found that the restriction at this point is not essential and may be eliminated if desired.

At each end of passage 37 is located oppositely disposed nozzles, nozzle 38 facing the left side of the device and nozzle 39 facing the right side. Coacting with these nozzles are closure members in the form of cantilever springs 41 and 42, these springs being attached at their upper ends to suitable projections on body 10 and bearing against projections 16 and 17 of member 12 at their lower ends. With member 12 centered, springs 41 and 42 are arranged to slightly clear nozzles 38 and 39, respectively, so that equal amounts of fluid will be supplied through these nozzles into chambers designated as 44 and 45. Springs 41 and 42 are preferably rather flexible, or in other words have a low rate, especially insofar as their influence on member 12 is concerned. By the very arrangement of the present device, wherein the nozzles 38 and 39 are located quite close to the point of attachment of the springs, their rate is much higher relative to forces developed by fluids emerging from the nozzles. Obviously, other valving or variable flow or bleed means may be used instead of nozzles and their cooperating closure members or plates.

Chambers 44 and 45 connect with transverse passages 46 and 47 which are, for convenience, generally parallel to passage 37 and bore 11. A nozzle 51 is arranged in passage 46 and a similar nozzle 52 is arranged in passage 47, these nozzles being in general alignment and spaced apart by somewhat more than the thickness of a flapper 53 arranged between them. These nozzles exhaust into a recess 54 connected by a passage 55 to recess 21 so that fluid passing nozzles 51 and 52 can be routed to the return conduit 27. As above, other adjustable valving or variable flow restricting means may be used instead of the present nozzles and flapper means. Flapper 53 is rigidly attached to an armature member 61 of an electromagnetic actuator 62 which includes, in addition to armature 61, a core member 63 and coils 64 and 65. Armature 61 is attached to the center pole of member 63 by a pair of beryllium-bronze hinge members having a reduced section to permit bending or flexure, only one of which members 66 is shown in this drawing.

While it is contemplated that actuator 62 will be immersed in oil or other suitable fluid, a sealing bellows 67 is arranged to seal the passage between body 10 and flapper 53. This bellows is preferably of the sort having a negligible spring rate and has as its function the sealing of the magnetic actuator from particles of iron that may be circulated with the hydraulic fluid. Preferably, pivot devices 66 are arranged to have a relatively high spring rate so that the position of armature 61 will be largely a function of the energization of coils 64 and 65 and only negligibly influenced by the flow of fluid through nozzles 51 and 52. It has been found, however, that by making these flexure members 66 somewhat more flexible, a portion of the ultimate response of the device will be the function of the acceleration of member 12.

This results because 12 must accelerate based on the magnitude of the differential pressures in chambers 44 and 45. These same differential pressure appear at nozzles 51 and 52. While it was stated that members 66 are preferably stiff enough that the pressures at 51 and 52 have no appreciable effect on 53, these members 66 are made flexible enough to be affected to some extent by the differential pressures imposed by nozzles 51 and 52. The result is then, in effect, a response to the forces that cause acceleration of member 12 and therefore a basis is provided for making the present device respond not only to the magnitude of the signals imposed but also to the rate of change of the signals. Obviously, the more rapidly flapper 53 is moved, the higher the differential pressure tends to be and the more the response that may be obtained from such forces. While it is possible to modify the above apparatus in this manner, it is generally preferable to maintain member 66 relatively stiff, as originally described, to thereby obtain smoother modulating characteristics of the overall device.

While closure members 41 and 42 are shown as cantilever springs, this arangement is only for convenience and any other suitable arrangement wherein the closure members are actuated under full control of member 12 is suitable, it again being emphasized that these members 41 and 42 are not intended to have any appreciable centering effect on member 12.

While nozzles 51 and 52, 38 and 39 are shown threaded in place and are thereby adjustable in production, it is obvious that any other suitable mode of attachment may be used. Preferably, though, these nozzles should be adjustable, the adjustability making this device very simple to assemble and calibrate for proper operation. Further, these adjustments eliminate the need for many of the close tolerances normally associated with hydraulic servo devices of the present sort.

The actuator 62 is basically of a known sort and it is obvious that any other suitable device may be used for moving flapper 53 toward or away from the nozzles 51 and 52. It should be noted that, as normally assembled, flapper 53 is spaced midway between nozzles 51 and 52 and there is no particular bias other than to this normal position.

To briefly explain the operation of the present device, let it be assumed that a voltage is applied to actuator 62 of a sort tending to move flapper 53 toward nozzle 51. With high pressure fluid being supplied through passage 26, recess 22, filter 34, passage 35 and through nozzles 38 and 39 into chambers 44 and 45, the flow of oil from chambers 44 and 45 through chambers 46 and 47 and nozzles 51 and 52 was uniform until flapper 53 moved toward 51. With uniform pressures in chambers 44 and 45, member 12 was centered so pressures in 31 and 32 remain unchanged from their previous values. Upon flapper 53 moving toward nozzle 51, the pressure in pasage 46 and chamber 44 tends to rise and the pressure in 45 and passage 47 tends to diminish because of the easier flow permitted through nozzle 52. The differential pressure thus caused tends to move member 12 toward the right and in moving toward the right permits high pressure fluid to leak past the left edge of member 14 and increase the pressure in passage 31 while the left edge of member 15 tends to move away from the edge of recess 23 and permit fluid to escape through recess 23 and thereby diminish the pressure in passage 32. At the same time, closure 41 moves closer to nozzle 38 and tends to restrict the flow through this nozzle, thereby tending to diminish the pressure in chamber 44. As member 42 is moved away from nozzle 39 the flow through this nozzle tends to increase the pressure in chamber 45. This tendency to change the pressures in chambers 44 and 45 is the reverse of that caused by the operation of flapper 53 and tends to limit and stabilize the travel of member 12 with the ultimate result that member 12 will move to such a position that the flow through nozzles 38 and 39 will be unequal by an amount compensating for the unequal flow through nozzles 51 and 52 which cause the operation in the first place. This adjustment of flow will be effected by movement of member 12 until the pressures in chambers 44 and 45 equalize, thereby stopping 12 at a position in accordance with the positioning of flapper 53. Thus, there is provided an effective feedback or follow-up arrangement wherein the position of member 12 is determined by the positioning of flapper 53. Obviously, when the present apparatus is used in a normal control system, a satisfying of the original condition resulting in a removal of the biasing conditions in actuator 62 and a consequent centering of flapper 53 will result in a reversal of the above operation and a centering of member 12.

While the preferred embodiment of the present invention has been disclosed, it is obvious that many substitutions and equivalents will become apparent to those familiar with this art. Therefore, the scope of this invention is to be determined only by the appended claims.

I claim:

1. In a control device, a body having a bore, opposed piston means within said bore, said bore and said piston means cooperating with said body to form opposed chambers, means for supplying fluid to each of said chambers including flow varying valving means for controlling the supply of fluid into each chamber, means for adjusting said flow varying valving means, each of said adjusting means being arranged for operation by said piston means, the relative positioning of the adjusting means serving to regulate the pressure of fluid in their respective chambers, additional passage means controlling the exhaustion of fluid from each of the said chambers comprising a pair of variable restrictions, means for varying said restrictions, and actuator means for said varying means.

2. A control device comprising a body having a bore, opposed piston means within said bore, said bore and said piston means cooperating with said body to form opposed chambers, said piston means being movable in response to a difference in fluid pressure in said chambers, means for supplying fluid to each of said chambers including a nozzle for each chamber, closure means for each nozzle, each of said closure means being arranged for operation by said piston means, the relative positioning of the closure means relative to and respective nozzles serving to regulate the supply of fluid to their respective chambers, discharge passage means for each of the said chambers comprising a pair of oppositely disposed spaced nozzles, flapper means arranged to control said oppositely disposed nozzles, the flow regulating abilities of said closure means and said flapper means being such that any position of said flapper means will result in operation of said closure means by said piston means until the pressures in said chamber are balanced, and actuator means for said flapper means.

3. In a control device, a body having a bore, opposed piston means within said bore, said bore and said piston means cooperating with said body to form opposed chambers, means for controlling the supply of fluid into each of said chambers including variable bleed valving means for each chamber, means for controlling each bleed valving means, said controlling means being arranged for operation by said piston means, the relative operation of said controlling means serving to regulate the supply of fluid into the respective chambers, additional passage means for each of the said chambers comprising a pair of oppositely disposed spaced nozzles for controlling the exhaustion of fluid from each chamber, flapper means arranged to control said oppositely disposed nozzles, and actuator means for said flapper means.

4. A control device comprising a body having a bore, opposed piston means within said bore, said bore and said piston means cooperating with said body to form opposed chambers, means for controlling the supply of fluid in each of said chambers including valving means for each chamber, said valving means being radially spaced from said bore, means for operating said valving means, each of said operating means being arranged for operation by said piston means, the relative operation of said operating means serving to regulate the supply of fluid in the respective chambers, additional passage means for each of the said chambers comprising a pair of flow control means arranged in series with said valving means and downstream thereof, and actuator means for said flow control means.

5. A control device comprising a body having a bore, opposed piston means within said bore, said bore and said piston means cooperating with said body to form opposed chambers, means for controlling the pressure of fluid in each of said chambers including variable orifice flow control means for each chamber, means including a spring for operating said flow control means, each of said operating means being arranged for operation by said piston means, the relative operation of said operating means serving to regulate the pressure of fluid in the respective chambers, flow passage means connected in series with said flow control means for each of said chambers including a pair of oppositely disposed spaced nozzles, flapper means arranged to control oppositely disposed nozzles, and actuator means for said flapper means.

6. A control device comprising a body having a bore, opposed piston means within said bore, said bore and said piston means cooperating with said body to form opposed chambers, means for controlling the supply of fluid in each of said chambers including a nozzle for each chamber, closure means for each nozzle, each of said closure means being arranged for operation by said piston means, the relative positioning of the closure means relative to the respective nozzles serving to regulate the supply in fluid to their respective chambers, further flow passage means for each of the said chambers comprising a pair of oppositely disposed spaced nozzles, flapper means arranged to control said oppositely disposed nozzles, and actuator means for said flapper means.

References Cited in the file of this patent

UNITED STATES PATENTS

| | | |
|---|---|---|
| 2,269,072 | Wilde | Jan. 6, 1942 |
| 2,601,867 | Alyea | July 1, 1952 |
| 2,625,136 | Moog | Jan. 13, 1953 |
| 2,709,421 | Avery | May 31, 1955 |
| 2,767,689 | Moog | Oct. 23, 1956 |
| 2,775,254 | Stanbury | Dec. 25, 1956 |
| 2,790,427 | Carson | Apr. 30, 1957 |
| 2,797,666 | Chubbuck | July 2, 1957 |
| 2,835,265 | Brandstadter | May 20, 1958 |

FOREIGN PATENTS

| | | |
|---|---|---|
| 753,443 | Great Britain | July 25, 1956 |